J. S. BANCROFT.
MEASURING MECHANISM FOR COMPOSING MACHINES.
APPLICATION FILED AUG. 16, 1918.
1,300,237.
Patented Apr. 15, 1919.
2 SHEETS—SHEET 1.
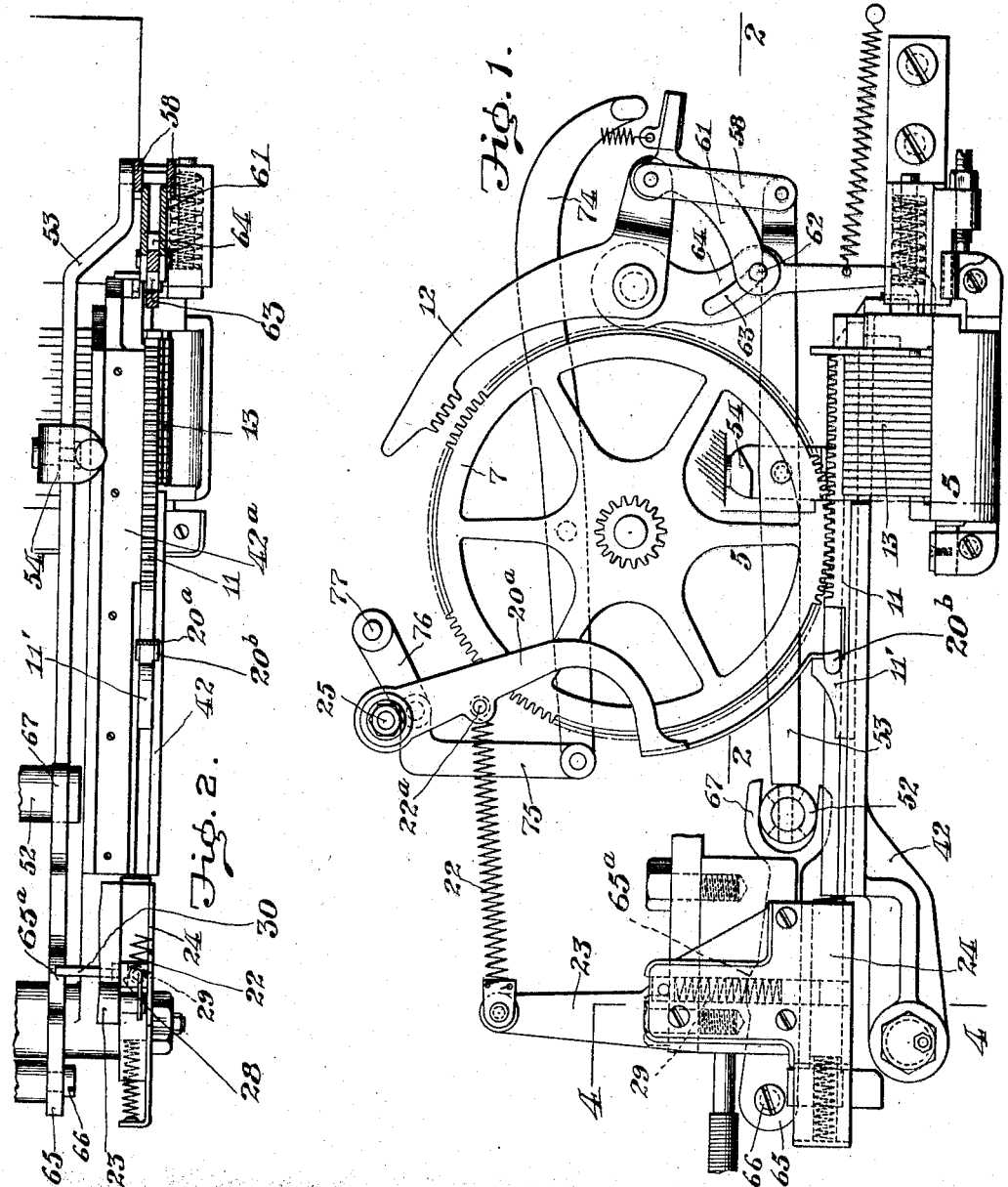
INVENTOR:
John Sellers Bancroft,
by Church & Church
His Attys.

J. S. BANCROFT.
MEASURING MECHANISM FOR COMPOSING MACHINES.
APPLICATION FILED AUG. 16, 1918.
1,300,237.
Patented Apr. 15, 1919.
2 SHEETS—SHEET 2.
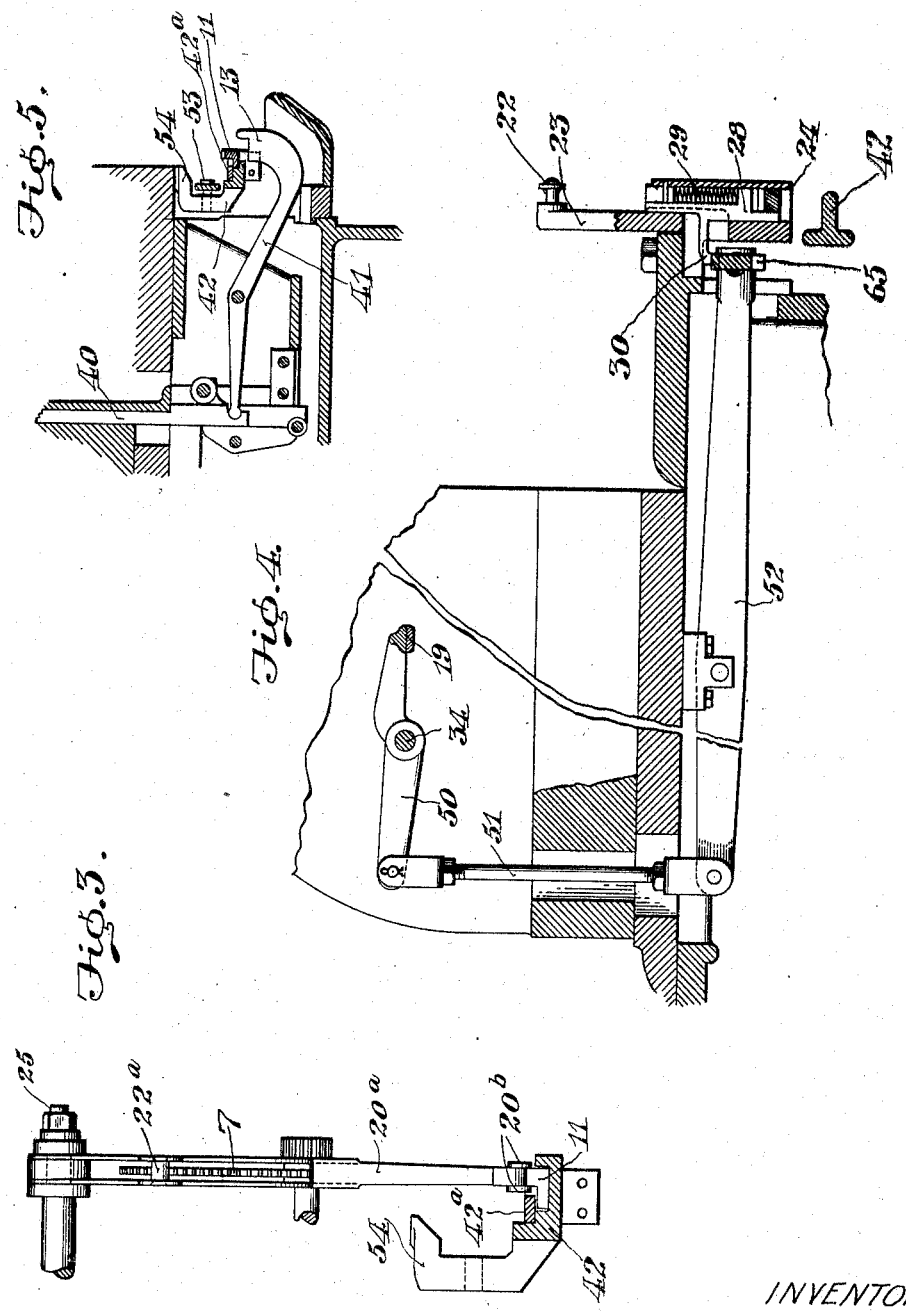
INVENTOR.
John Sellers Bancroft

UNITED STATES PATENT OFFICE.

JOHN SELLERS BANCROFT, OF PHILADELPHIA, PENNSYLVANIA, ASSIGNOR TO LANSTON MONOTYPE MACHINE COMPANY, OF PHILADELPHIA, PENNSYLVANIA, A CORPORATION OF VIRGINIA.

MEASURING MECHANISM FOR COMPOSING-MACHINES.

1,300,237.  Specification of Letters Patent.  Patented Apr. 15, 1919.

Application filed August 16, 1918. Serial No. 250,203.

*To all whom it may concern:*

Be it known that I, JOHN SELLERS BANCROFT, a citizen of the United States, and a resident of Philadelphia, county of Philadelphia, and State of Pennsylvania, have invented certain new and useful Improvements in Measuring Mechanism for Composing-Machines; and I do hereby declare the following to be a full, clear, and exact description of the same, reference being had to the accompanying drawings, forming part of this specification, and to the characters of reference marked thereon.

This invention relates to measuring mechanism for composing machines, particularly for keyboard machines of the type in which the manual operation of keys produces signals, preferably in the form of perforations in paper ribbons or controllers such as are employed to control the action of automatic typecasting and composing machines, the measuring mechanism of such keyboard machine also being operated to measure for each signal the set width of the type represented by said signal and to totalize these measurements as the line is being composed. The object of the present invention is to provide a measuring mechanism for such keyboard machines, which shall be durable and to a maximum degree certain in its operation under all conditions, particularly under the condition of high speed operation as when the machine is equipped with an automatic repeat mechanism.

In the accompanying drawings:

Figure 1 is a front elevation of a measuring device embodying the present invention.

Fig. 2 is a sectional plan on approximately line 2—2 of Fig. 1.

Fig. 3 is an elevation of certain parts of said device, other parts being in section.

Fig. 4 is a sectional view on line 4—4 Fig. 1, showing a portion of the rear stop mechanism for said measuring device as well as operating parts therefor; and Fig. 5 is a sectional view substantially on the line 5—5, Fig. 1, showing the forward stop mechanism and operating parts but omitting the units wheel.

The composing machine to which the measuring device of this invention is herein shown applied and in connection with which it will be herein described is that of United States Patent #944,405, dated December 28th, 1909, to the specification of which attention is directed for a full and complete description of the machine, it being sufficient for present purposes to designate in general only those parts thereof with which the mechanism of the present invention is more intimately related, for example (employing the same reference numerals as those of the patent) the punch bar operated universal bar 19 (Fig. 4) carried on a shaft 34 to which is secured the arm 50 operating the link 51 and levers 52 and 53 (Fig. 1); the forward stop bars 13 (Figs. 1, 2 and 5) operated by levers 41 carrying the stopbars, said levers being operated by the vertical bars 40 (Fig. 5) operatively connected with certain of the said punch bars, namely, those which are known as dimensioning punch bars; the units rack 11, slidable in the units rack carrier 42, provided with the offset 54 and operated from the lever 53; the units wheel 7; the pawl 12, the link 58, the lever 61 carrying the pin 62 engaging the slot 63 in the dependent arm 64; the restoring lever 74 operated through the link 75 and arm 76 from the shaft 77 operated by the restoring motor (not shown).

When a key of the composing machine is depressed one or more punch bars and associated punches are moved upwardly, the latter perforating a controller strip or ribbon in accordance with the particular key depressed. The upward movement of the punch bar raises the universal bar 19 thus lowering the arm 50 and link 51 and operating the lever 52 to raise its front end and with it the left end of lever 53 (Fig. 1). During the first part of this movement the right-hand end of lever 53 acts as a pivot, but when the offset 54 of the units rack carrier 42 has come into contact with its stop, as shown, in which position the units rack 11 carried by the carrier 42 has its teeth properly in mesh with the units wheel 7, the lever 53 centrally pivots at the point of its connection with the offset 54 so that further movement produces downward movement of the right end of the lever 53, thus moving the teeth of the pawl 12 out of engagement with the teeth of the units wheel 7 in a manner readily understood. The rack being meshed and the pawl out of mesh, the units wheel 7 is now rotated by suitable and well known motor means which is coupled up with the units wheel so as to tend to rotate it in a counter-clock-wise direction at all times except when the restoring mechanism is brought into action, as when the end of a line of composition has been reached and it is desired to restore the parts to position for beginning the next line. Such counter-clock-wise or forward rotation of the units wheel draws the units rack to the right until it comes against a stop bar 13 projected into its path, whereupon the parts all come to rest, as shown, the units wheel having rotated through a definite number of units as determined and controlled by the particular stop bar projected. One of the punch bars which have been operated by the depression of a key will have caused the universal bar 19 to move upwardly, and, the dimensioning punch bar, has also moved upwardly the particular stop bar 13 with which it is connected by a lever acting to move downwardly the bar 40 (Fig. 5) to move upwardly the selected stop bar 13 upon the end of its lever 41. Each of the stop bars and its operating punch bar is operated by the depression of a key or keys representing characters of definite set wise dimension and the stop bars are so located that they cause rotation of the units wheel to cease when it has by its rotation measured in units the proper set wise dimension of the character struck. Upon the release of the depressed key the universal bar will move downwardly and the left hand end of lever 53 will also move downwardly; its right hand end moving upwardly to cause the pawl 12 to engage with the units wheel teeth and the center of the lever thereafter moving downwardly to disengage the units rack from the units wheel so that the rack may be returned as by spring pressure means to its initial position at the left where it is stopped against a rear or zero stop 24.

It is apparent that the movement back and forth of the unit rack and the operations of the mechanisms just described, must take place every time a key is struck. When the operation of the keys is very rapid and especially when the operation of the measuring device is brought about by the use of an automatic repeat mechanism, such as is well known in the art, the blows of the unit rack upon both the forward and rearward stops are considerable. The stops shown, both the forward stop 13 and the rear or zero stop 24 are constructed substantially to prevent a rebound of the unit rack upon impact. These stop mechanisms are fully described in United States Patent No. 1,193,346 dated August 1st, 1916, and need not be described in detail at the present time. The present invention contemplates improvements in measuring mechanism the object of which is to render it more certain and durable in its operation for which purpose the various parts have been made as light as possible, the weight has been carefully distributed, the forces and shocks carefully proportioned and directed and the unit rack and the spring pressure means for returning it to its zero position have been definitely located with respect to the unit wheel. In the structure of this invention the return pull of the unit rack is in a direction which is exactly opposite to the force which drives it forwardly; the rack itself is constructed with a horizontal bearing surface and the forces for moving the rack in both directions have no tendency to move it laterally or to remove it from said surface. Other changes are also incorporated as will clearly appear in the following description.

The unit rack is returned by means of a lever 20$^a$ pivoted to the machine frame at the point 25, and resting against the head 11' of the unit rack 11 at the lower end of said lever 20$^a$.

This lever is formed of a single integral piece of sheet metal by bending, the upper part being bifurcated, one of the bifurcations being in front of the units wheel and the other one behind the units wheel. The lower spring portion of the lever is extremely light and extends downwardly from the bifurcated portion curving in a direction substantially corresponding with the curvature of the units wheel until its lower end reaches the units rack head. It will be observed that the lower portion of the lever is in the plane of the units wheel and is yieldable in said plane while rigid laterally thereof. The bifurcated upper end of the lever is extremely strong and rigid though light and straddles the wheel so that the lever is in all respects symmetrically located with respect to the plane of the units wheel. The spring 22 secured at one end to the post 23 and at the other end to the pin 22$^a$, the latter connecting the bifurcated portions of the lever near its upper end, is entirely in the plane of the unit wheel: it is elongated when the rack is driven forwardly and acts as a pressure means for returning the rack to its initial position. The extreme lower end of the lever is bent downwardly to come into close contact with the forward end of the head of the units rack, there being a portion of the rack cut away to make room for this lever end and the lever is provided with ears 20$^b$ (observable in Figs. 1, 2 and 3) which are bent rearwardly to contact with both the front and back side walls of the head of the units rack. It will be seen that the distribution of weight of the lever is such as to make its lower end which engages with the unit rack of extreme lightness; this end is also yielding so that the blow of the rack head against the zero stop is scarcely augmented by the momentum of the lever. The point of attachment of the spring 22 to the lever, as well as the point of attachment of the spring to the post 23 and the spring itself, are all in the vertical plane of the units wheel. The return pull exerted by the spring 22 and the lever 20$^a$ on the units rack is therefore exactly opposite to the pull exerted on said rack by the units wheel when it rotates to cause the rack to move forwardly until stopped by stop bar 13. Thus the rack is always free from operating forces tending to move it laterally in its bearing upon the carrier 42 particularly designed, as will now be pointed out, to coöperate with the above symmetrical operating arrangement whereby a smooth, non-vibrating movement of the rack is assured.

The units rack carrier 42 is provided with a channel for the units rack which has a wide horizontal bearing bottom and front and back side guide walls. The units rack is made with a broad bottom bearing surface which rides against the bottom bearing surface of this channel; the side walls of the units rack being guided by the side walls of the channel. The rack extends back of the plane of the units wheel slightly more than in front thereof, the back portion being slightly reduced in height so as to make room for a top retaining plate 42$^a$ (Figs. 3 and 5) secured to the top of the carrier 42 and serving to retain the units rack in its channel by overhanging the upper part of the reduced portion of said rack. It will be seen that the rack has its bearing practically wholly upon the broad bottom of the channel, and that there is no tendency for it to bind or vibrate laterally. The operating force, in each direction, as will be seen, produces pressure on the horizontal bearing faces but none on the side or the top guide faces, the action being entirely smooth and free from disturbing tendencies even when the operation is accomplished at very high speed. It is also to be noted that the shocks are taken up by the forward and rearward ends of the units rack striking directly against the forward end rear stops 13 and 24 respectively. The points of these strikings are direct and not through the intermediary of laterally extending lugs, as is usual in the type of machine under consideration, and are in the plane of the units wheel and more specifically as the drawings show, approximately in the line of motion of the center of gravity of the rack. The shock of stopping the rack, like its driving, is therefore taken up in said line of motion of the units rack so that there is no tendency of the rack to lateral motion on its bearing on the rack carrier under any of the circumstances of operation.

Due to the fact that the spring operated lever 20$^a$ for returning the units rack operates entirely outside of the periphery of the units wheel, the rack has been slightly lengthened and for this reason the zero stop 24 has been placed farther to the left (Fig. 1) than is the case in Patent 1,193,346 previously mentioned. The bolt 28 of the zero stop 24 which bolt is under tension of the spring 29 is moved upwardly when a key is depressed, or in other words, when the left end of lever 53 and the front end of lever 52 are moved upwardly, by a bolt operating lever 65 pivoted to a fixed part of the machine at 66 and connected with the levers 52 and 53 at the junction of said levers by means of the bifurcated arm 67. This lever 65 is provided with a rounded portion 65$^a$ for contact with the operating lug 30 of the bolt 28. The principle of operation of the rear stop is of course in no way changed by the interposition of this lever 65. The post 23 as illustrated is an upward extension from the framework for the zero stop mechanism.

I claim:—

1. A typographic composing machine embodying the following instrumentalities, to-wit: a units wheel, a units rack support provided with a horizontal bearing surface, a units rack supported on said surface, a spring and lever device for returning the units rack to initial position and forward and rear stops for arresting the rack, said wheel, rack, spring, and lever lying in approximately the vertical plane extending through the line of motion of the center of gravity of the rack and said stops lying in said line of motion, whereby the forces for moving the rack and the means for arresting its motion in each direction are applied directly in said line of motion.

2. A typographic composing machine embodying the following instrumentalities, to-wit: a units wheel, a units rack support provided with a horizontal bearing surface, a units rack supported on said surface and located in the plane of the wheel, a lever pivoted at its upper end and having a bifurcated, rigid upper portion straddling the wheel and a lower spring portion in the plane of said wheel and engaging directly with said rack, a rear stop, and a spring connected with the rigid portion of the lever and tending to retain the rack against said rear stop.

3. A typographic composing machine embodying the following instrumentalities, to-wit: a units wheel, a units rack support provided with a horizontal bearing surface and with side and top guide surfaces, a units rack supported on said bearing surface, and prevented by said guide surfaces, from accidentally becoming displaced, a spring and lever device for returning the units rack to initial position, forward and rear stops for arresting the rack, said wheel, rack and spring and lever device lying in approximately the vertical plane extending through the line of motion of the center of gravity of the rack and said stops lying in said line, whereby the forces for moving the rack and the means for arresting its motion in each direction tend to maintain it on its bearing surface and to prevent its lateral vibration on said surface.

4. A typographical composing machine embodying the following instrumentalities, to-wit: a units rack support provided with a horizontal bearing surface and with top and side guide surfaces, a units rack supported on said bearing surface during rest and motion in each direction, a units wheel for driving the rack forwardly while maintaining it on said bearing surface, a spring and lever device for returning the rack to initial position while maintaining it on said surface and forward and rear stops for arresting the motion of the rack, said stops being in the line of motion of the center of gravity of the rack.

5. A lever for operating a rack constituting a part of the measuring mechanism of a typographic composing machine, said lever being formed of a single integral piece of sheet metal by bending and comprising a bifurcated, rigid upper portion and a lower spring portion rigid laterally of the plane of the lever and yieldable in said plane.

JOHN SELLERS BANCROFT.

Copies of this patent may be obtained for five cents each, by addressing the "Commissioner of Patents, Washington, D. C."